(12) United States Patent
Ivakitch et al.

(10) Patent No.: US 7,908,869 B2
(45) Date of Patent: Mar. 22, 2011

(54) THERMAL AND EXTERNAL LOAD ISOLATING IMPELLER SHROUD

(75) Inventors: Richard Ivakitch, Toronto (CA); Philip Ridyard, Mississauga (CA); Patrick Chiu, Scarborough (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1135 days.

(21) Appl. No.: 11/532,564

(22) Filed: Sep. 18, 2006

(65) Prior Publication Data

US 2008/0069690 A1    Mar. 20, 2008

(51) Int. Cl.
*F02K 3/04* (2006.01)
*F01D 25/28* (2006.01)

(52) U.S. Cl. ........ 60/798; 60/751; 60/226.1; 415/173.1; 415/214.1

(58) Field of Classification Search ................. 60/226.1, 60/751, 269, 796, 797, 798; 415/173.1, 214.1, 415/173.2–173.5
See application file for complete search history.

(56) References Cited

U.S. PATENT DOCUMENTS

| | | | |
|---|---|---|---|
| 4,248,566 A * | 2/1981 | Chapman et al. | 415/26 |
| 4,264,271 A | 4/1981 | Libertini | |
| 4,502,276 A | 3/1985 | Pask | |
| 4,529,355 A | 7/1985 | Wilkinson | |
| 4,687,412 A | 8/1987 | Chamberlain | |
| 5,417,501 A * | 5/1995 | Hyde et al. | 384/542 |
| 5,618,162 A * | 4/1997 | Chan et al. | 415/206 |
| 5,619,850 A * | 4/1997 | Palmer et al. | 60/785 |
| 6,506,015 B2 * | 1/2003 | Nagata et al. | 415/173.1 |
| 7,363,762 B2 * | 4/2008 | Montgomery et al. | 415/173.5 |

OTHER PUBLICATIONS

International Search Report dated Dec. 13, 2007 on corresponding PCT International Application No. PCT/CA2007/001591.

* cited by examiner

*Primary Examiner* — Ted Kim
(74) *Attorney, Agent, or Firm* — Ogilvy Renault LLP

(57) ABSTRACT

A gas turbine engine has a compressor assembly and a turbine assembly rotationally mounted on a shaft, the turbine assembly being driven by hot gases discharged from a combustion chamber disposed between the compressor and turbine assemblies, the compressor having a centrifugal impeller for pressurizing and impelling air into the combustion chamber. The engine also includes an impeller shroud covering the bladed portion of the centrifugal impeller, the impeller shroud having a support bracket having a thin and curved load-isolating profile for supporting a strut that secures the impeller shroud to a case of the engine.

9 Claims, 2 Drawing Sheets

THERMAL AND EXTERNAL LOAD ISOLATING IMPELLER SHROUD

TECHNICAL FIELD

The invention relates generally to gas turbine engines and, more particularly, to impeller shrouds of gas turbine engines.

BACKGROUND OF THE ART

Gas turbine engines such as those used as aircraft turbojets or turbofans typically comprise a rotating fan, a low-pressure compressor and a high-pressure compressor as well as high-pressure and low-pressure turbines that are axially mounted to separate coaxial shafts for rotation about a central axis of the engine. The high-pressure compressor typically includes a set of multiple axial stage rotors followed by a centrifugal impeller. Enshrouding the blades of the centrifugal impeller is a static impeller shroud. The impeller shroud is typically mounted to one of the engine cases in the compressor section such as, for example, by means of a strut that extends from the impeller shroud radially outwardly to the inner case of the bypass duct. The strut secures the impeller shroud in place relative to the impeller blades so that there is a minimal clearance between the impeller blades and the impeller shroud. Minimizing the clearance between the impeller blades and the impeller shroud is instrumental in optimizing the capacity of the impeller to pressurize the air to the elevated pressures required for high engine performance.

Due to thermal and other external loads, the impeller shroud may deflect. External loads include externally applied loads from the assembly fit as well transient operating conditions. Deflections of the impeller shroud are most pronounced at the tip of the shroud. Likewise, the deflections and distortions of the impeller blades due to thermal effects and centrifugal loading is most pronounced at the tips of the blades. Therefore, controlling variations in the tip clearance, i.e. the gap between the tip of the impeller blades and the impeller shroud as these two components move relative to each other, is critical to optimizing pressurization and thus engine performance. In other words, tip clearance should be tight enough to ensure strong pressurization of the air discharging from the impeller but it must not be so tight that there is a risk that deflections of the impeller shroud relative to the impeller (due to extreme thermal or other loads) can cause the blades and the shroud to come into contact with each other.

Accordingly, there is a need to provide an impeller shroud that is isolated from thermal loads and other external loads so as to maintain an unvaryingly tight tolerance on tip clearance.

SUMMARY OF THE INVENTION

It is therefore an object of this invention to provide an impeller shroud that is isolated from thermal and other external loads so to maintain an unvaringly tight tolerance on tip clearance.

In one aspect, the present invention provides a gas turbine engine comprising a compressor assembly and a turbine assembly rotationally mounted on a shaft, the turbine assembly being driven by hot gases discharged from a combustion chamber disposed between the compressor and turbine assemblies, the compressor having a centrifugal impeller for pressurizing and impelling air into the combustion chamber. The engine also includes an impeller shroud covering the centrifugal impeller, the impeller shroud having a support bracket having a thin and curved load-isolating profile for supporting a strut that secures the impeller shroud to a case of the engine.

In another aspect, the present invention provides an impeller shroud for use with a centrifugal impeller of a high-pressure compressor of a gas turbine engine. The impeller shroud comprises a support bracket mounted to the impeller shroud, the support bracket having a thin and curved load-isolating profile and means for securing the support bracket to a case of the gas turbine engine.

In another aspect, the present invention provides a method of installing an impeller shroud for controlling tip clearance between impeller blades of a centrifugal impeller and an impeller shroud. The method comprises steps of providing a load-isolating support bracket on the impeller shroud, the support bracket having a thin and curved load-isolating profile and securing the impeller shroud relative to the impeller blades by connecting the load-isolating support bracket to an engine case whereby thermal and other external loads are attenuated by the load-isolating support bracket.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
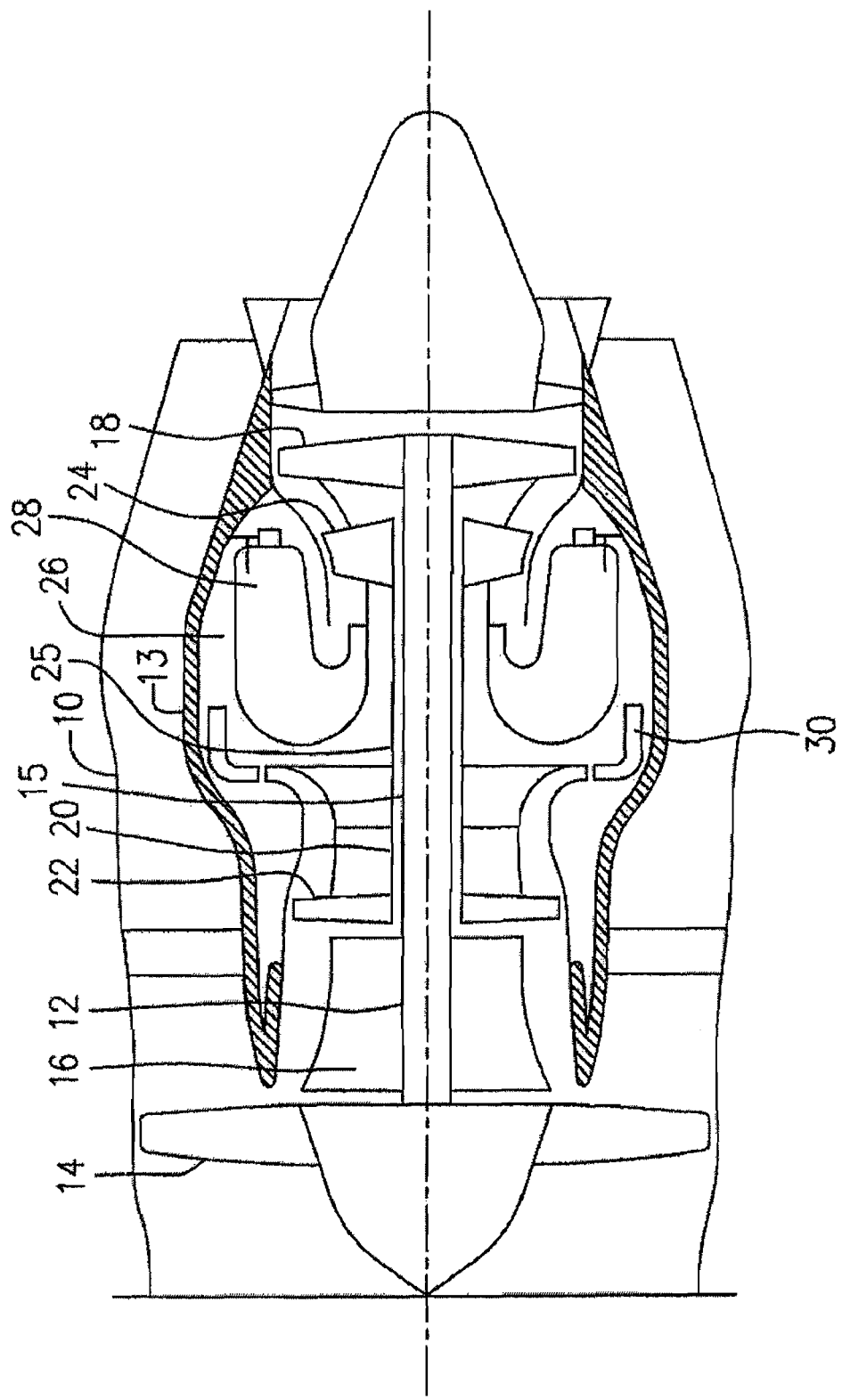
FIG. 1 is a schematic cross-sectional view of a turbofan as an example of a gas turbine engine that could incorporate embodiments of the present invention.

Referring to FIG. 1, a turbofan gas turbine engine incorporating an embodiment of the present invention is presented as an example of the application of the present invention, and includes a housing 10, a core casing 13, a low pressure spool assembly seen generally at 12 which includes a shaft 15 interconnecting a fan assembly 14, a low pressure compressor 16 and a low pressure turbine assembly 18, and a high pressure spool assembly seen generally at 20 which includes a shaft at 25 interconnecting a high pressure compressor assembly 22 and a high pressure turbine assembly 24. The core casing 13 surrounds the low and high pressure spool assemblies 12 and 20 in order to define a main fluid path (not indicated) therethrough. In the main fluid path there are provided a combustion section 26 having a combustor 28 therein. Pressurized air provided by the high pressure compressor assembly 22 through a diffuser 30 enters the combustion section 26 for combustion taking place in the combustor 28.

Figure 2:
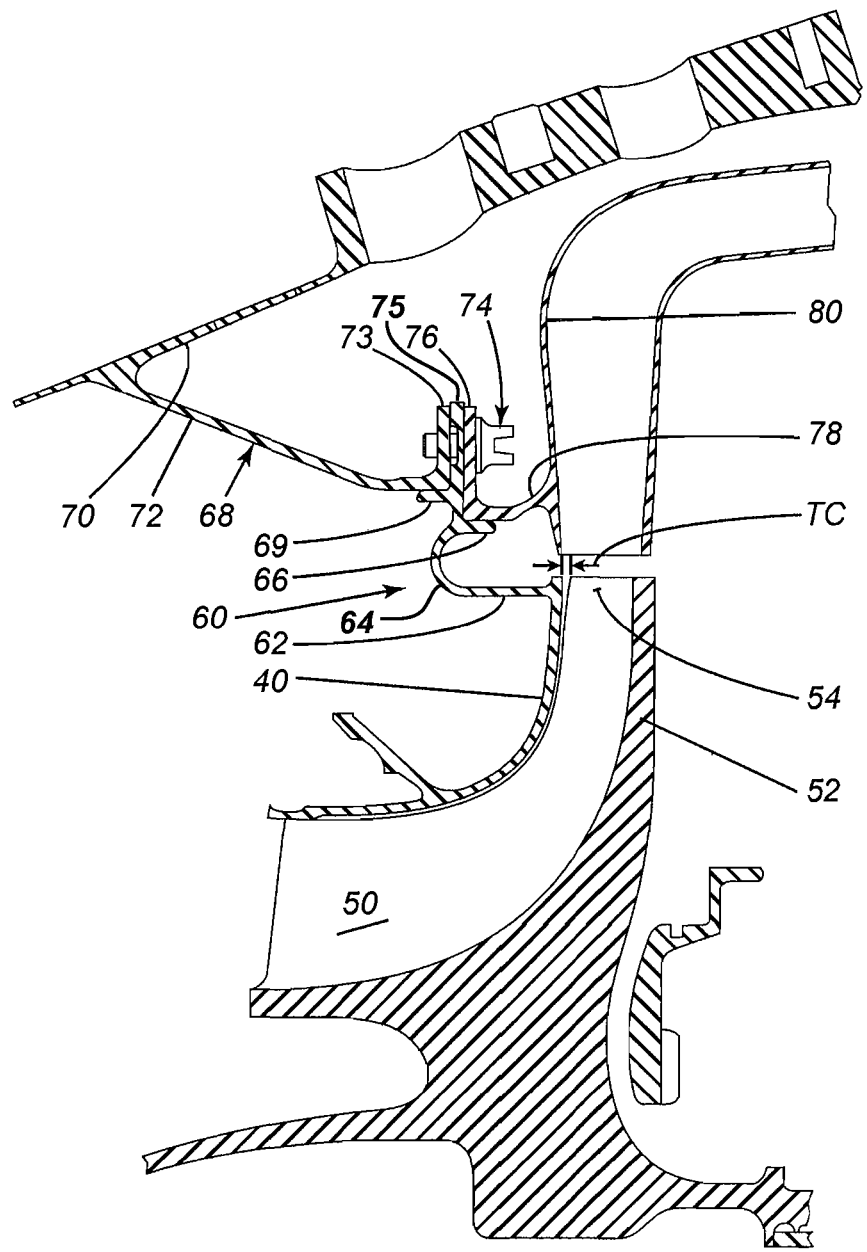
FIG. 2 is a cross-sectional view of an impeller shroud in accordance with an embodiment of the present invention.

FIG. 2 shows, in cross section, an impeller shroud 40 in accordance with an embodiment of the present invention. The impeller shroud 40 covers, or "enshrouds", the blades of the centrifugal impeller 50. The impeller rotates between the impeller shroud 40 and a backface 52 that extends outwardly from a hub to which the compressor is mounted. The impeller pressurizes and impels air into the combustion chamber from which hot gases are discharged to drive the turbine assembly. At a tip 54 of the impeller blades 50 is a small gap referred to as the tip clearance TC. The impeller shroud 40 has a support bracket 60 mounted to the impeller shroud 40, the support bracket 60 having a thin and curved load-isolating profile.

The impeller shroud 40 also includes means for securing the support bracket 60 to a case 70 of the gas turbine engine.

In one embodiment, such as the embodiment illustrated in FIG. 2, the support bracket 60 has a hairpin shape although other thin and curved profiles could also be utilized. In this particular embodiment, as shown, the hairpin support bracket is integrally formed with the impeller shroud. Alternatively, the hairpin support bracket could be welded or fastened to the impeller shroud. In the particular embodiment shown in FIG. 2, the integrally formed hairpin-shaped bracket has a lower extension member 62 that extends axially forward from the impeller shroud and a semicircular curved portion 64 connecting the lower extension member 62 to an upper support member 66 that is adapted to support a means for securing 68 the impeller shroud to a case 70 of the engine. In this particular embodiment, the lower extension member 62 and the upper support member 66 are both substantially parallel to the shaft 25 (shown in FIG. 1) supporting the compressor and turbine assemblies.

As shown in FIG. 2, the means for securing 68 can include a strut 72 for securing the impeller shroud 40 to an inner case of a bypass duct. In addition, as shown in this particular embodiment, the means for securing 68 also comprises a spigot 74 for fastening the support bracket 60 to the strut 72.

In one embodiment, such as the one illustrated in FIG. 2, the hairpin-shaped support bracket 60 has a shoulder 69 for supporting a flange 73 of the strut 72. Similarly, the upper support member 66 can be used to support a flange 76 of a buttress member 78 that buttresses a tangential annular diffuser 80. The tangential annular diffuser 80 close proximity to the tip 54 of the impeller blades 50 (into which the impeller discharges highly compressed air) and an exit that discharges into the combustion chamber. A flange 75 extends radially from the support bracket 60, between curved portion 64 and upper support member 66, and is captured between flanges 73 and 76. The buttress member 78 is radially supported by upper support member 66.

The thin and curved profile of the impeller shroud 40, when installed in a gas turbine engine, such as the turbofan shown in FIG. 1, isolates the impeller shroud from thermal and other external loads (transient operating conditions, loads due to the assembly fit, etc.) which can cause the tip clearance TC to vary beyond the close tolerances required for optimized engine performance. In other words, vibrations and loads due to thermal effects or installation loads are substantially attenuated by the thin, curved profile of the support bracket, resulting in only minimal forces being transferred to or from the impeller shroud. The load-isolating support bracket therefore diminishes the deflections of the impeller shroud relative to the impeller. Accordingly, the tolerance of the gap between the impeller tip and the shroud (i.e. the tip clearance TC) can be tightened, thus enhancing performance of the engine.

In other words, the foregoing also provides a method of installing an impeller shroud for controlling tip clearance between impeller blades of a centrifugal impeller and an impeller shroud. The method includes steps of providing a load-isolating support bracket on the impeller shroud, the support bracket having a thin and curved load-isolating profile. An existing gas turbine engine could be retrofitted with an improved impeller shroud to isolate the shroud from thermal and other external loads. The impeller shroud is then secured relative to the impeller blades by connecting the load-isolating support bracket to an engine case whereby thermal and other external loads are attenuated by the load-isolating support bracket.

The above description is meant to be exemplary only, and one skilled in the art will recognize that changes may be made to the embodiments described without departing from the scope of the invention disclosed. For example, the impeller baffle can be used not only for turbofans or turbojets, but also for turboprops, turboshafts or any other gas turbine engine. Still other modifications which fall within the scope of the present invention will be apparent to those skilled in the art, in light of a review of this disclosure, and such modifications are intended to fall within the appended claims.

The invention claimed is:

1. A gas turbine engine having an case therearound, the case having a central axis defining an axial direction, the engine comprising:
   a compressor assembly and a turbine assembly rotationally mounted on a shaft, the turbine assembly being driven by hot gases discharged from a combustion chamber disposed between the compressor and turbine assemblies, the compressor having a centrifugal impeller for pressurizing and impelling air into the combustion chamber; and
   an impeller shroud covering the bladed portion of the centrifugal impeller, the impeller shroud having a support bracket mounted to the case of the engine for supporting the impeller shroud in the engine, the support bracket having a hairpin shape composed of inner and outer cylindrical annuluses joined by a curved profile annulus, the inner and outer annuluses extending parallel to the central axis, the support bracket further including a flange configured for mounting the support bracket to the engine case, the flange extending radially from the support bracket intermediate the outer cylindrical annulus and the curved profile annulus.

2. The gas turbine engine as defined in claim 1 wherein the hairpin support bracket is integrally formed with the impeller shroud.

3. The gas turbine engine is defined in claim 1 wherein the curved profile annulus is semicircular.

4. The gas turbine engine as defined in claim 1 wherein the hairpin-shaped support bracket is fastened to a strut of the case with a spigot.

5. The gas turbine engine as defined in claim 1 wherein the support bracket extends from the shroud immediately adjacent a terminal portion of the shroud at the impeller exit.

6. An impeller shroud for use with a centrifugal impeller of a high-pressure compressor of a gas turbine engine, the impeller shroud comprising:
   a support bracket mounted to the impeller shroud, the support bracket having a hairpin shape composed of inner and outer cylindrical annuluses joined by a curved profile annulus, the inner and outer annuluses extending parallel to the central axis, and
   the support bracket also having a member configured for connection to a case of the engine, the member including a flange configured for mounting the support bracket to the engine case, the flange extending radially from the support bracket intermediate the outer cylindrical annulus and the curved profile annulus.

7. The impeller shroud as defined claim 6 wherein the member comprises a spigot for fastening the support bracket to the case.

8. The impeller shroud as defined in claim 6 wherein the hairpin support bracket is integrally formed with the impeller shroud.

9. The impeller shroud as defined in claim 6 wherein the support bracket extends from the shroud immediately adjacent a terminal portion of the shroud at the impeller exit.

* * * * *